United States Patent
Chamberlain et al.

(10) Patent No.: US 9,751,582 B2
(45) Date of Patent: Sep. 5, 2017

(54) BICYCLE ASSEMBLY WITH BOTTOM BRACKET AREA

(71) Applicant: Specialized Bicycle Components, Inc., Morgan Hill, CA (US)

(72) Inventors: Jason L. Chamberlain, Morgan Hill, CA (US); Robb H. Jankura, Morgan Hill, CA (US); Brian Daniel Robinson, Morgan Hill, CA (US); Bradley L. Paquin, Santa Cruz, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 15/130,746

(22) Filed: Apr. 15, 2016

(65) Prior Publication Data

US 2016/0288856 A1 Oct. 6, 2016

Related U.S. Application Data

(63) Continuation of application No. 14/250,245, filed on Apr. 10, 2014, now Pat. No. 9,315,229.

(51) Int. Cl.
| | |
|---|---|
| *B62K 3/02* | (2006.01) |
| *B23P 11/02* | (2006.01) |
| *B29C 70/86* | (2006.01) |
| *B29C 53/82* | (2006.01) |
| *B62K 19/08* | (2006.01) |

(Continued)

(52) U.S. Cl.
CPC ............. *B62K 3/02* (2013.01); *B23P 11/025* (2013.01); *B29C 53/821* (2013.01); *B29C 70/68* (2013.01); *B29C 70/681* (2013.01); *B29C 70/86* (2013.01); *B29D 12/00* (2013.01); *B62K 19/02* (2013.01); *B62K 19/08* (2013.01); *B62K 19/16* (2013.01); *B62K 19/30* (2013.01); *B62K 19/34* (2013.01); *B62M 3/003* (2013.01); *B29K 2105/0872* (2013.01); *B29K 2307/04* (2013.01); *B29K 2705/00* (2013.01); *B29L 2031/3091* (2013.01); *B62K 2700/04* (2013.01); *B62K 2700/16* (2013.01)

(58) Field of Classification Search
CPC ......... B62M 3/003; B62K 19/34; B62K 19/16
See application file for complete search history.

(56) References Cited

U.S. PATENT DOCUMENTS

| | | | |
|---|---|---|---|
| 4,545,691 | A | 10/1985 | Kastan et al. |
| 4,828,781 | A | 5/1989 | Duplessis et al. |

(Continued)

FOREIGN PATENT DOCUMENTS

| | | |
|---|---|---|
| CN | 101722659 | 6/2010 |
| CN | 202657185 | 1/2013 |
| WO | WO 2012/069389 | 5/2012 |

OTHER PUBLICATIONS

European Search Report for App No. 15162777.5 dated Aug. 4, 2015.

*Primary Examiner* — Kevin Hurley
(74) *Attorney, Agent, or Firm* — Knobbe Martens Olson & Bear LLP (57) ABSTRACT

A bicycle assembly can include a main frame having a bottom bracket area to receive a bottom bracket. The bottom bracket area can be made of carbon fiber with one or more embedded seat blanks to serve as bearing surfaces within the bottom bracket area. The disks may be machined to a high tolerance to receive a bottom bracket.

10 Claims, 10 Drawing Sheets

(51) Int. Cl.
    *B62K 19/16*      (2006.01)
    *B62K 19/34*      (2006.01)
    *B29D 12/00*      (2006.01)
    *B62M 3/00*       (2006.01)
    *B29C 70/68*      (2006.01)
    *B62K 19/02*      (2006.01)
    *B62K 19/30*      (2006.01)
    *B29K 105/08*         (2006.01)
    *B29K 307/04*         (2006.01)
    *B29K 705/00*         (2006.01)
    *B29L 31/30*          (2006.01)

(56) References Cited

U.S. PATENT DOCUMENTS

| | | |
|---|---|---|
| 5,076,601 A | 12/1991 | Duplessis |
| 5,116,071 A | 5/1992 | Calfee |
| 5,271,784 A * | 12/1993 | Chen .................. B29C 70/345 156/156 |
| 5,273,303 A | 12/1993 | Hornzee-Jones |
| 5,368,804 A | 11/1994 | Hwang et al. |
| 5,613,794 A | 3/1997 | Isaac et al. |
| 6,267,399 B1 | 7/2001 | Buckmiller et al. |
| 6,443,033 B1 | 9/2002 | Brummer et al. |
| 6,543,308 B2 | 4/2003 | Harrington |
| 7,597,338 B2 | 10/2009 | I et al. |
| 7,762,571 B2 | 7/2010 | Dodman et al. |
| 8,066,295 B1 | 11/2011 | Cusack et al. |
| 8,302,504 B2 | 11/2012 | Dal Pra' |
| 8,882,125 B2 | 11/2014 | Paquin et al. |
| 8,925,948 B2 | 1/2015 | Dal Pra et al. |
| 2011/0193314 A1 | 8/2011 | Guichard et al. |
| 2013/0147152 A1 | 6/2013 | Paquin et al. |
| 2013/0181424 A1 | 7/2013 | Yu |
| 2017/0021888 A1 * | 1/2017 | Hastie .................. B62K 19/16 |

* cited by examiner

BICYCLE ASSEMBLY WITH BOTTOM BRACKET AREA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF THE INVENTION

The present invention relates generally to bicycle systems and frame assemblies. In particular, the present invention relates to a frame assembly for receiving a bottom bracket.

DESCRIPTION OF THE RELATED ART

A bicycle crankset is part of a bicycle drivetrain that converts the reciprocating motion of the rider's legs into rotational motion used to drive the rear wheel. It may include one or more chainrings attached to the pedal crank to which the pedals attach. The rider acts on the pedals to create the rotational motion. A bottom bracket connects the crankset to the bicycle and allows the crankset to rotate freely. The bottom bracket can include a spindle attached to the crankset, and bearings that allow the spindle and pedal cranks to rotate. The chainrings and pedals attach to the pedal cranks. The bottom bracket generally fits inside a bottom bracket shell, which may connect parts of the bicycle frame such as the seat tube, down tube and/or chain stays.

SUMMARY OF THE INVENTION

There is a continual need for improvement in bicycle frames, bottom brackets, and other assemblies related thereto. Accordingly, in some embodiments, a bottom bracket area is configured to allow the use of a carbon fiber bicycle frame that receives a metal bottom bracket.

In one aspect, a method of forming a bicycle frame includes the steps of providing at least one seat blank having a first side and a second side opposite the first side, forming at least a portion of a frame around the at least one seat blank such that the frame prevents movement of the seat blank relative to the frame, and machining the frame and the seat blank. The method may further include the step of providing one of a mandrel and an internal compression bladder. In some embodiments, forming at least a portion of a frame around the seat blank further includes forming a seat support structure that abuts the first and second sides of the seat blank. In some embodiments, forming at least a portion of a frame around the seat blank further includes forming a seat support structure such that the seat support structure surrounds the seat blank on all sides. In some embodiments, forming at least a portion of a frame around the at least one seat blank further includes forming carbon fiber plies around the at least one seat blank and the internal bladder to form a seat support structure that surrounds the at least one seat blank on all sides. The method may further include the step of curing the combined carbon fiber plies and the at least one seat blank. In some embodiments, curing the combined carbon fiber plies and the at least one seat blank comprises applying heat to the combined carbon fiber plies and the at least one seat blank. In some embodiments, machining the frame and the seat blank further includes machining the seat support structure from the first side. In some embodiments, machining the frame and the seat blank further includes machining the seat support structure from both the first and second sides simultaneously. In some embodiments, machining the frame and the seat blank further includes machining the frame and the seat blank from the first side and then machining the frame and the seat blank from the second side.

In another aspect, a bicycle assembly includes a frame. The frame includes a top tube having a first end and a second end, a down tube having a first end and a second end, a head tube connected to the first end of the top tube and first end of the down tube, a seat tube connected to the second end of the top tube and the second end of the down tube, one of the seat tube and the down tube defining a carbon fiber frame portion having a first axial end and a second axial end, a first seat blank molded in between carbon fiber sidewall layers of the first axial end of the frame portion, and a second seat blank molded in between carbon fiber sidewall layers of the second axial end of the frame portion and spaced from the first seat blank, each of the first and second seat blanks embedded within the carbon fiber layers such that carbon fiber surrounds each of the first disk and the second disk and the first disk and the second disk are machined after molding such that the frame portion is configured to receive a bottom bracket bearing. In some embodiments, the machined first disk defines a first bearing seat and the machined second disk defines a second bearing seat. In some embodiments, the first bearing seat defines a first inner annular rib and the second bearing seat defines a second inner annular rib. The bicycle assembly may further include a bottom bracket positioned within the frame portion and a crankset attached to the bottom bracket. In some embodiments, the first and second seat blanks are integrally formed with the carbon fiber frame portion. In some embodiments, the first and second bearing seats include at least one of a shoulder, a protrusion, a shelf, and a non-constant diameter of the frame portion.

In yet another aspect, a bicycle assembly includes a frame. The frame includes a top tube, a down tube, a head tube connecting the top tube and the down tube at front ends of both the top tube and the down tube, a seat tube connecting the top tube and the down tube at back ends of both the top tube and the down tube, one of the seat tube and the down tube defining a frame portion having an interior cavity with a first axial end and a second axial end. The frame portion includes carbon fiber and a pair of seat blanks positioned within and integrally formed with the carbon fiber and axially machined to form a bottom bracket area such that each of the disks defines a portion of an interior surface of the bottom bracket area. The bicycle assembly may further include a bearing locating feature. In some embodiments, the bearing locating feature includes at least one of a shoulder, a protrusion, a shelf, and a non-constant diameter of the bottom bracket area.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION OF THE PREFERRED EMBODIMENT

Figure 1:
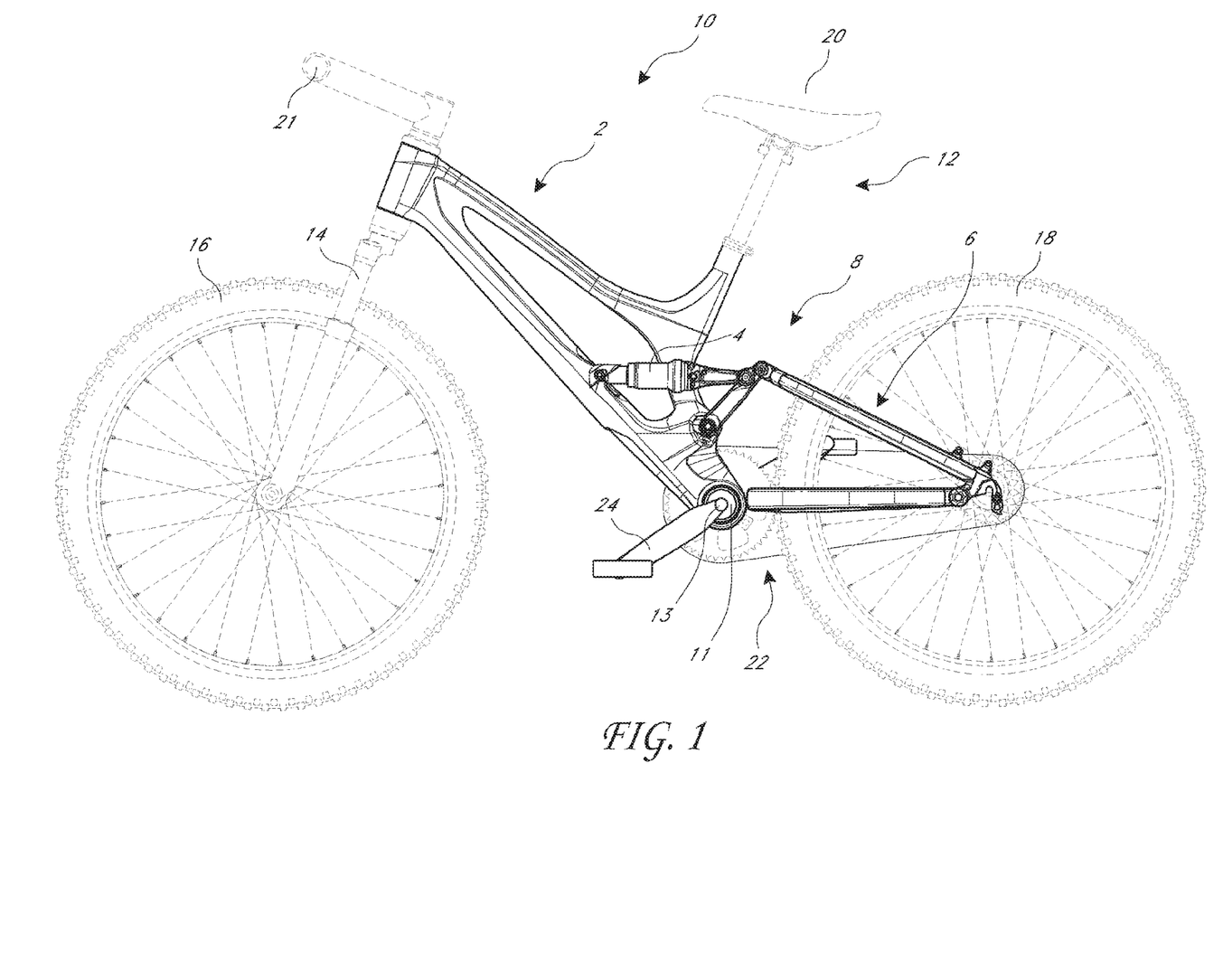
FIG. 1 is a side view of an embodiment of a bicycle.

The following description will be disclosed for illustrative purposes relative to a bicycle 10, as shown in FIG. 1, and more particularly, to off-road bicycles or mountain bikes and to road bikes. Those skilled in the art will appreciate that the embodiments as described herein may equally apply to other types of pedal driven vehicles such as children's bikes, cruisers, recumbents, tricycles, quadracycles, unicycles, paddle boats, or other foot or hand driven vehicles.

To aid in the description of the bicycle 10, certain directional or relative terms may be used herein. The term "longitudinal" refers to a direction, length or a location between the front and rear of the bicycle 10. The term "lateral" refers to a direction, length or location between the sides of the bicycle 10. Heights may be described as relative distances from a surface upon which the bicycle 10 is operated in a normal manner. Thus, the terms "above" or "below" generally apply to the bicycle as assembled, and being oriented as it would be normally ridden, or as it is depicted in any of the relevant figures. Front, rear, left, and right directions generally refer to those directions from the perspective of a rider normally seated on the bicycle 10.

With reference to FIG. 1, the bicycle 10 includes a frame assembly 12, a fork 14, a front wheel 16 and rear wheel 18. The frame assembly 12 supports a seat assembly 20 at a location spaced rearward from a handlebar assembly 21. The handlebar assembly 21 is rotatably supported by the frame assembly 12 and is coupled to the fork 14 and the front wheel 16 such that side to side movement of the handlebar assembly 21 results in similar movement of the fork 14 and the front wheel 16.

The frame assembly 12 also supports the rear wheel 18. A drivetrain is configured to allow a rider of the bike 10 to supply power to one or both of the wheels 16, 18. In the illustrated arrangement, the drivetrain includes pedal cranks 24 that are coupled to the rear wheel 18 by a multispeed chain drive transmission 22. The multispeed chain drive transmission 22 may include one or more gears, or chainrings, coupled to the pedal crank 24 and one or more gears, or sprockets, coupled to the rear wheel 18. The chainrings and sprockets are coupled by an endless drive chain that is capable of transmitting torque from the pedal crank 24 to the rear wheel 18. In other embodiments, the transmission 22 may be a belt drive transmission. One or more shifting mechanisms, such as a derailleur, may be provided to shift the chain between the chainrings or sprockets. In other embodiments, a gear box may be provided to shift the chain or belt drive between the chain rings or sprockets. The shifting mechanism may be controlled by rider controls mounted on the handlebar assembly 21.

The bike 10 may also include front and rear brake assemblies associated with the front and rear wheels 16, 18, respectively. The brake assemblies may be controllable by a rider of the bike 10, typically via hand controls provided on the handlebar 21. The brake assemblies can be disc brakes, rim brakes, or other suitable types of brakes assemblies.

The frame assembly 12 can have one of many different configurations. For example, the frame assembly can have a main frame 2 and a subframe 6. The main frame 2 and the subframe 6 can be rigidly connected or configured for relative movement, such as with a rear suspension assembly 8, including a shock absorber 4. Because of their typical shapes, the main frame 2 is often referred to as the front triangle and the subframe 6 is often referred to as the rear triangle. Other shapes and configurations for the frame assembly 12 can also be used.

Figure 2A:
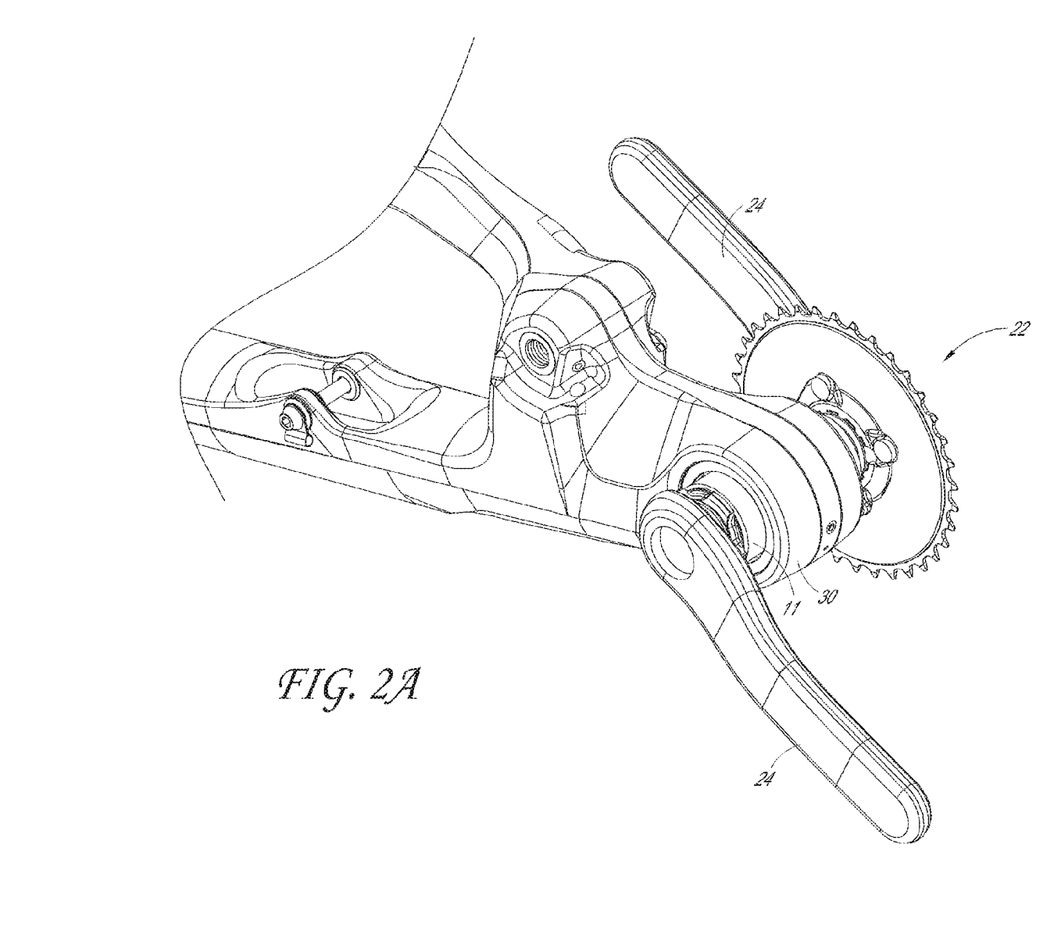
FIG. 2A illustrates a perspective view of a bottom bracket assembly and bottom bracket area of a bicycle frame.

FIG. 2A shows a closer view of the bottom bracket area 30 of the main frame 2 of a bicycle. As can be seen, the bottom bracket area 30 may be manufactured with the main frame 2 as a single piece. Furthermore, the bottom bracket area 30 is configured to provide annular support for a bottom bracket 11, as will be discussed in greater detail below.

Figure 2B:
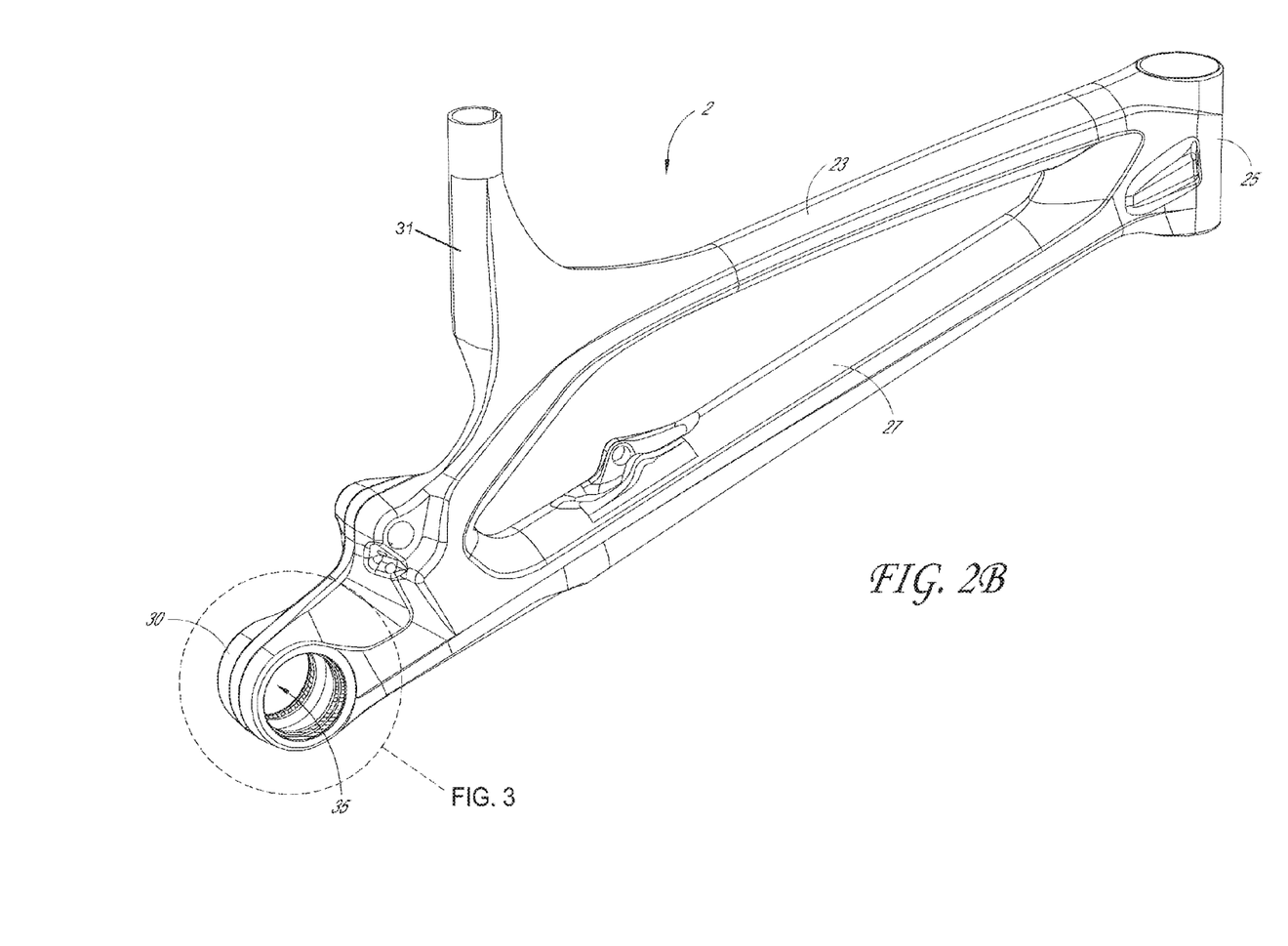
FIG. 2B illustrates a perspective view of an embodiment of a bicycle frame.

FIG. 2B illustrates a configuration of the main frame 2 of a bicycle. As can be seen, the main frame 2 can be a triangular main frame. A main frame 2 according to some embodiments comprises a seat tube 31, a top tube 23, and a head tube 25. The top tube 23 can connect the seat tube 31 and the head tube 25. A seat post with an attached saddle 20 (shown in FIG. 1) can be installed in the seat tube 31. A steering post or column which connects the handle bars and the fork 14 (shown in FIG. 1) can be installed in the head tube 25. Some embodiments may further include a down tube 27 and a bottom bracket area 30. The down tube 27 can connect the bottom bracket area 30 and the head tube 25. A bottom bracket 11 (shown in FIGS. 1 and 2A) can be installed into the bottom bracket area 30 to which pedal cranks 24 and pedals can be attached (shown in FIGS. 1 and 2A).

Figure 3:
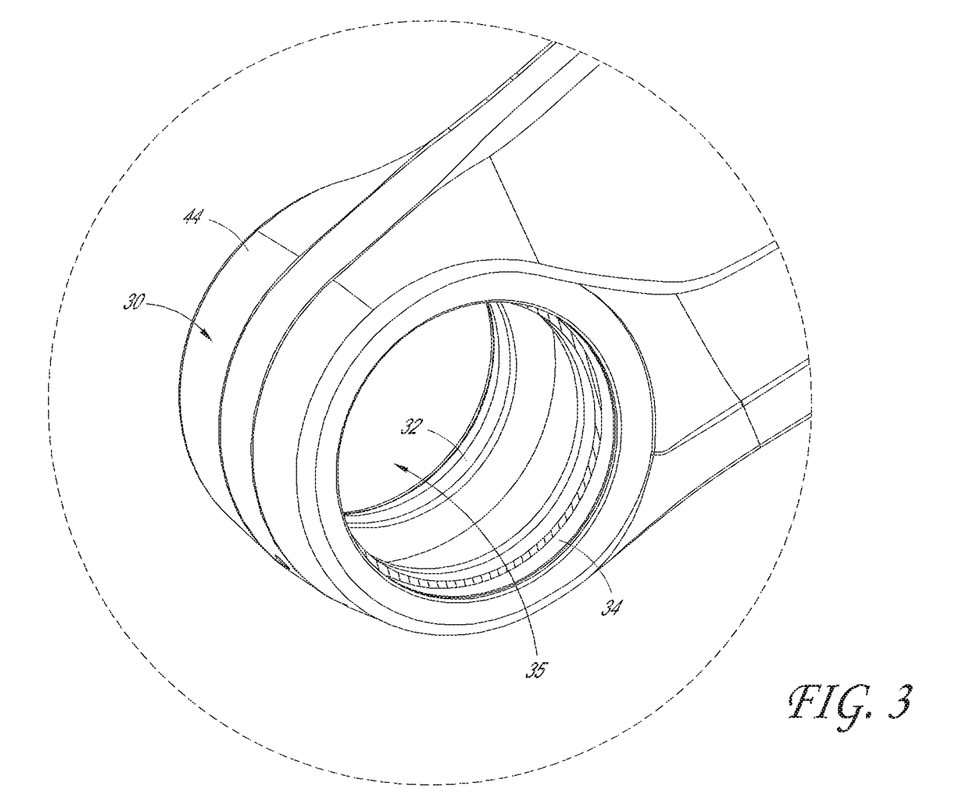
FIG. 3 is a detail view of the bicycle frame of FIG. 2B.

Referring now to FIG. 3, a detail view of the frame assembly 12 is shown. The frame assembly 12 has a bottom bracket area 30 that typically connects the down tube 27 and the seat tube 31. The frame assembly 12 can be made of carbon-fiber-reinforced polymer (carbon fiber) or other synthetic and/or composite materials. The bottom bracket area 30 desirably includes two seat blanks or metal disks 32, 34 that are preferably encapsulated within the carbon fiber material and may be used as annular supports for a bottom bracket 11 (FIG. 1). In some embodiments, the seat blanks or disks 32, 34 are preferably made of metal but could also be made of resin or polycarbonate material. While a circular disk or shaped is preferred, the seat blanks 32, 34 may be shaped as a disk, a donut, a square, or any other shape that may be machined to have a circular opening. As will be discussed in further detail below, these disks may be machined after molding and curing to receive a bottom bracket bearing assembly.

Figure 5:
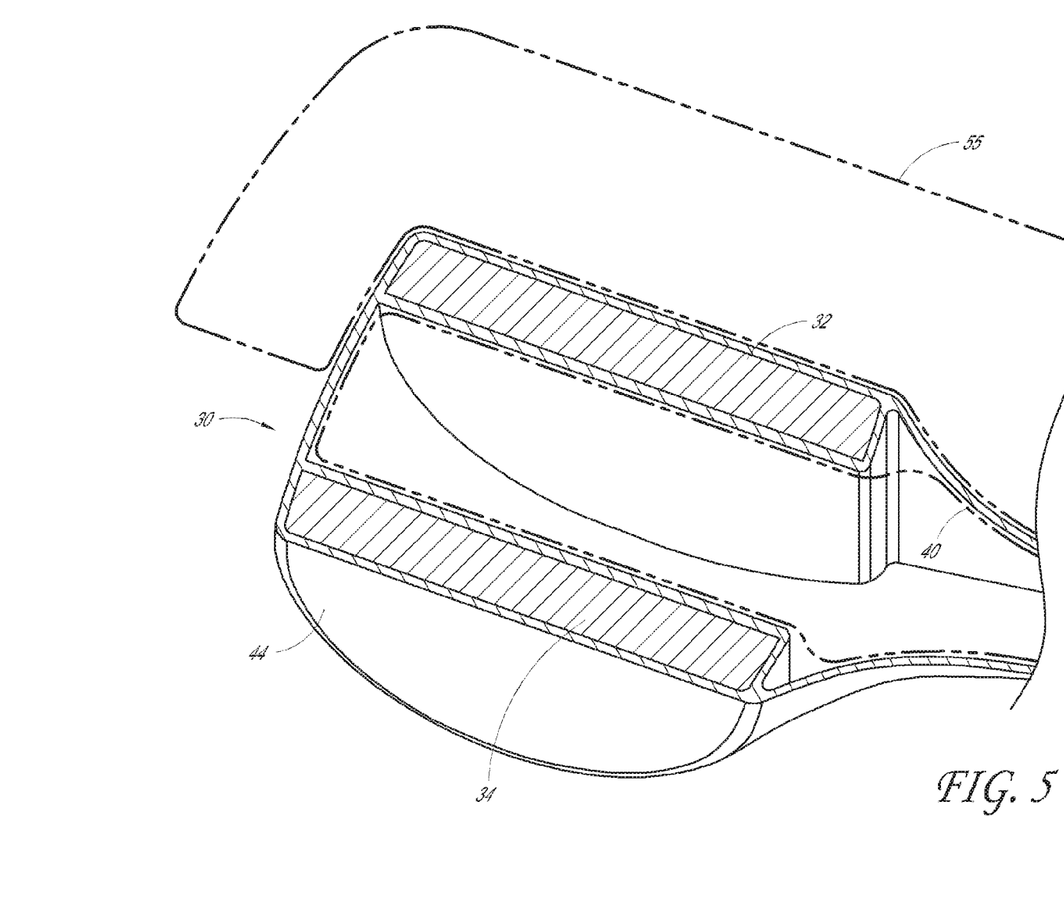
FIG. 5 is a cross section of a bottom bracket area within a mold prior to machining.
Figure 6:
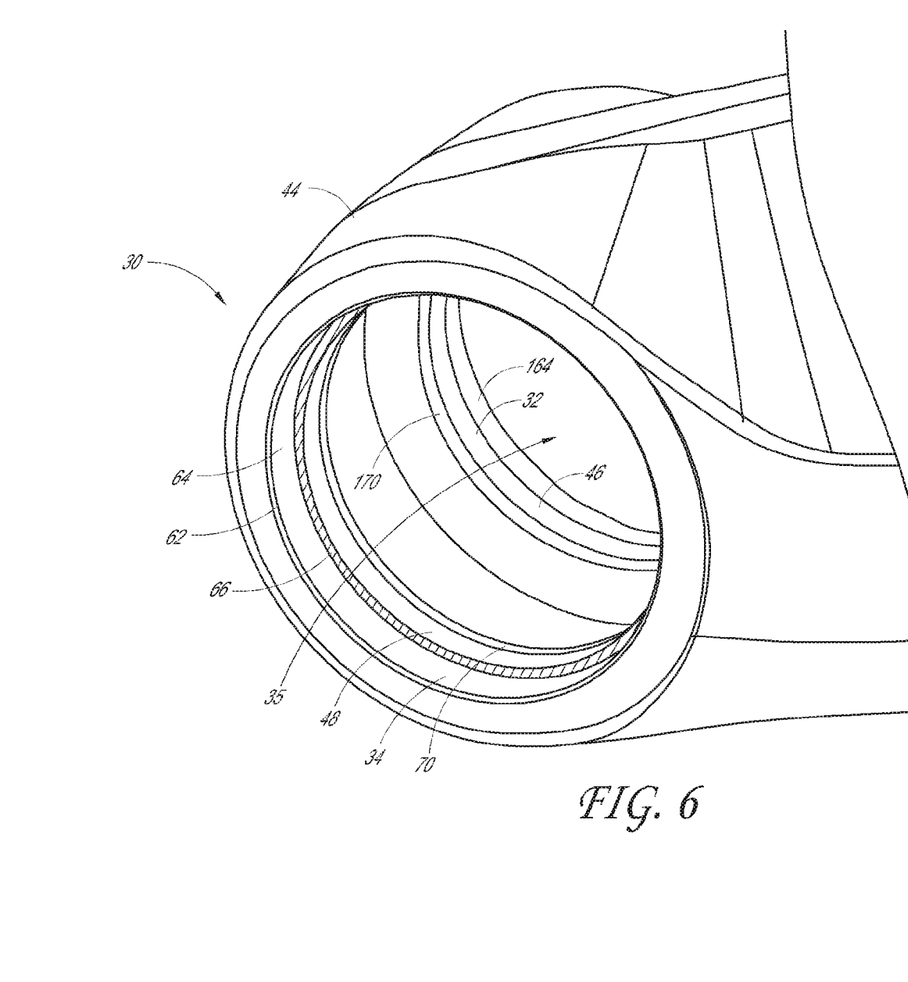
FIG. 6 shows the bottom bracket area of FIG. 5 after machining.
Figure 7:
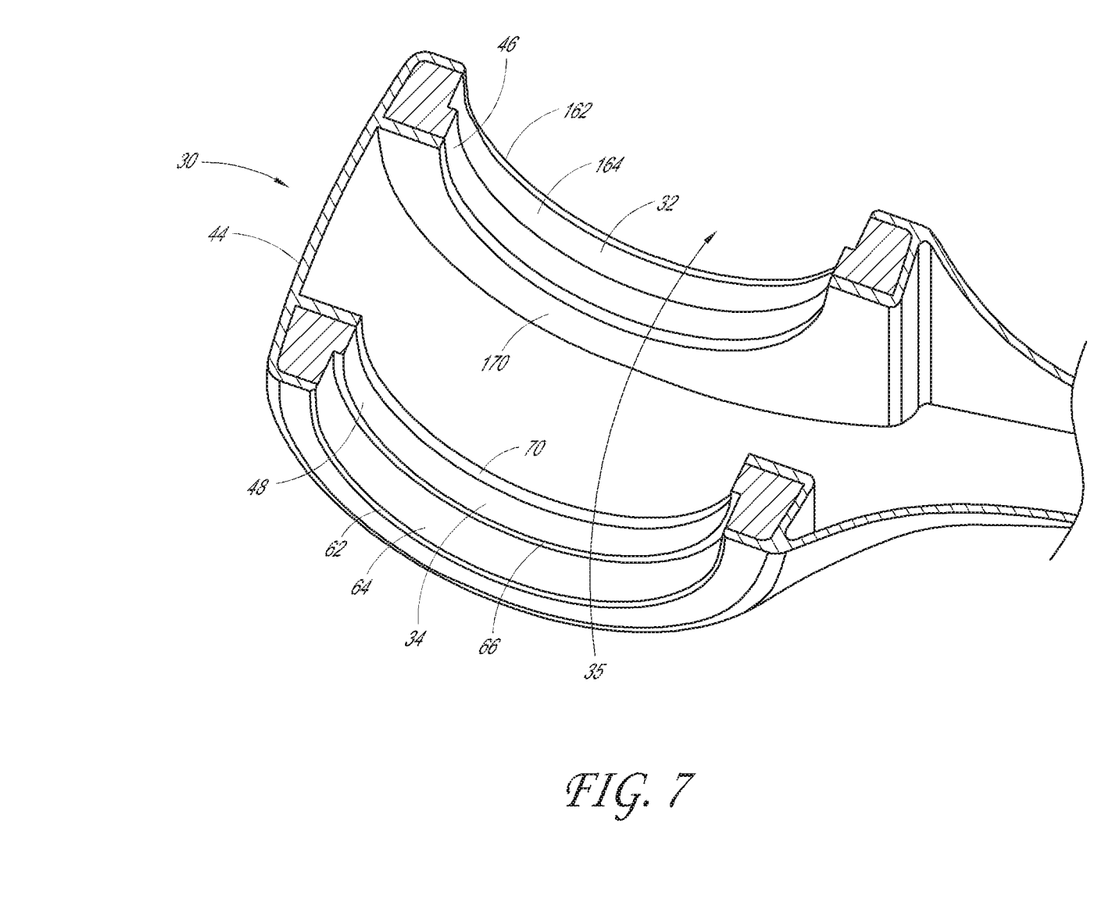
FIG. 7 is a cross section of the bottom bracket area after machining illustrating the bearing races.

Referring now to FIGS. 5-7, a bottom bracket area 30 is shown. The bottom bracket area 30 can include a carbon fiber body, such as cylindrical body 44 with one or more metal disks 32, 34 that are positioned within and integrally molded with the cylindrical body 44 to form a single piece. In one embodiment, including the illustrated embodiment, the carbon fiber may be molded around the disks 32, 34 in a configuration such that the carbon fiber keeps the disks from moving relative to the cylindrical body 44. Preferably, the disks 32, 34 are aligned within the cylindrical body 44 to form a composite seat support structure for a bottom bracket in which carbon fiber axially abuts the blanks 32, 34 on both sides and radially abuts at least three points of the discs and preferably radially surrounds the discs, as best shown in FIG. 7. The one or more metal disks 32, 34 and a portion of the carbon fiber body 44 may be machined after molding to form an axial opening 35 within the cylindrical body 44 such that the bottom bracket area is configured to receive a bottom bracket. Preferably, machining the disks 32, 34 creates an opening within the cylindrical body 44 such that the bottom bracket 11 (FIG. 1) is precisely aligned to provide optimal power transfer to the crankset. After machining, in some embodiments, the one or more metal disks 32, 34 can include raised surfaces 46, 48, that are spaced apart from a bearing seat surface 64, 164 of each disk 32, 34 by a vertical surface, such as vertical surface 66 of disk 34, shown in FIG. 7. A similar vertical surface (not shown) may separate surface 46 from bearing surface 164 of disk 32. The surfaces 64, 164 can provide a surface for a bearing, or a bearing seat, that can provide increased durability within the carbon fiber bottom bracket area. In some embodiments, the surfaces 46, 48 may define a smaller diameter of the cylindrical opening of the bottom bracket area 30 than the surfaces 64, 164. As shown, after machining, a layer of carbon fiber desirably forms a carbon fiber surface 62, 162 on the outer axial edge of each disk 32, 34. Additionally, after machining, a layer of carbon fiber also desirably form a carbon fiber surface 70, 170 on an inner axial edge of each disk 32, 34. The carbon fiber surfaces 62, 162, 70, and 170 provide support and stability for the disks 32, 34 within the bottom bracket area 30. In some embodiments, the thickness of each of these surfaces 62, 162, 70, and 170 may be the same or the thickness of each surface may vary. In some embodiments, the thickness of the inner surfaces 70 and 170 may be thicker or thinner than the outer surfaces 62 and 162. As shown, the two metal disks 32, 34 can be within the bottom bracket area 30 and spaced away from one another. Desirably, the metal disks are configured and positioned to provide an even and balanced interface and bearing surface within the bottom bracket area 30.

The bottom bracket area can include one or more features to locate the bearing within the bottom bracket area. For example, the one or more disks can include one or more bearing surfaces 46, 48 to locate the bearing position, such as a cir-clip groove, a shoulder, a protrusion, etc. FIG. 7 illustrates the bearing surfaces 46, 48 in each of the metal disks 32, 34. The bearing surface can correspond with a protrusion on the bearing or bottom bracket to properly position the bearings within the bottom bracket area. In some embodiments, an edge of the one or more disks can provide the locating feature. For example, the disk can have an inner diameter of a size different from the adjacent carbon fiber to create a type of shelf. The bottom bracket can then have a corresponding feature which abuts the shelf to ensure the proper placement. It should be understood that the bottom bracket may be a sealed cartridge that uses one or more locating features, or bearing assemblies may be separately attached the bottom bracket area so that at least one locating feature can be used for each bearing assembly.

Figure 8:
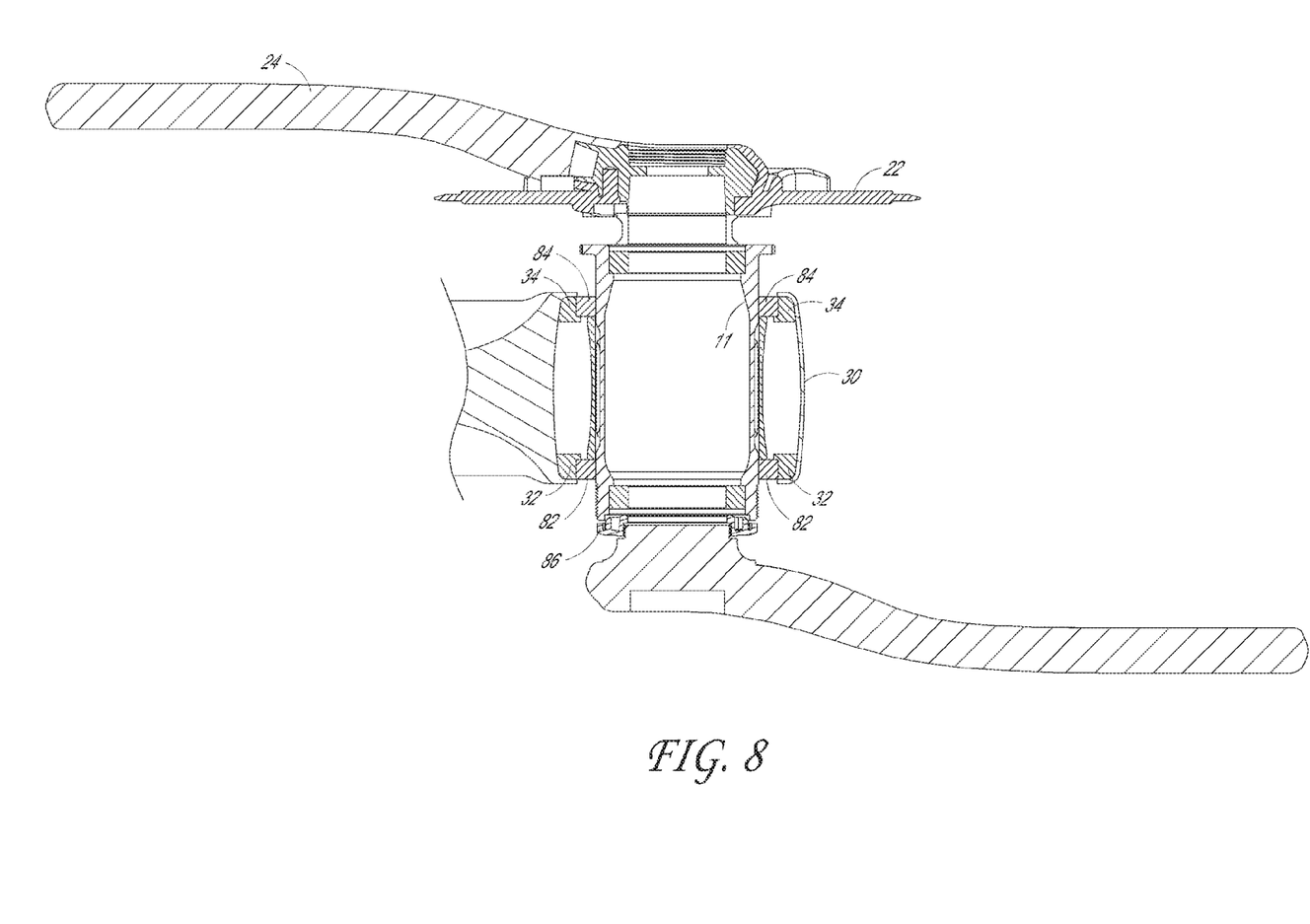
FIG. 8 is a cross section of a bottom bracket assembly and bottom bracket area.

A bottom bracket 11 (shown in FIG. 1) having bearings which support a spindle 13 can be placed in direct contact with the one or more metal disks 32, 34. A cartridge bottom bracket 11 can also be placed within the carbon fiber cylindrical body 44 contacting the one or more metal disks 32, 34, as shown in FIG. 8. The one or more metal disks can be made of a metal alloy such as an aluminum alloy or a titanium alloy. The use of aluminum, titanium, and/or certain other materials can allow for a lightweight yet strong and durable bearing surface.

In one example, a bottom bracket area can have a length ranging from 50 to 120 mm. The length can depend on many features, for example a road bike may have a bottom bracket area length between about 50 to 70 mm or between about 61.5 to 68 mm while a mountain bike may have a bottom bracket area length between about 65 to 90 mm or between about 73 to 80 mm. In some embodiments, plastic cups can also be used with the bottom bracket 11. This bottom bracket system with plastic cups may utilize a bottom bracket area that has a length on the smaller side of the ranges discussed above.

The size and position of the disks can be determined by the size and position of the bearings to be used. With two or more metal disks, each could have a length extending between the sides from between 4 to 10 mm, and for example, 7 mm. The two or more metal disks could have a length that is the same as, slightly larger or slightly smaller than the size of bearings to be used. The two or more metal disks may or may not be positioned to be equally spaced from the center of the bottom bracket area or may or may not be symmetrically positioned within the bottom bracket area. Preferably, the disks are surrounded by carbon fiber that abuts the disks on both sides, as shown in FIG. 7. In some embodiments, the thickness of the carbon fiber on each side of each disk may be between 0.1 to 5 mm, and for example, 2 mm. In some embodiments, the amount of carbon fiber of each side of each disk could be the same thickness. In other embodiments, the thickness of the carbon fiber on an outside edge of each disk may be less than the thickness of carbon fiber on an inside edge of each disk.

In some embodiments, the bottom bracket area and one or more metal disks can have an inner diameter of between about 40 to 70 mm or between about 46 to 60 mm. The size of the inner diameter can be dependent on many features, such as whether the bearings are directly pressed into the bottom bracket area (for example 40 mm) and whether plastic cups are to be used (for example 56 mm).

The thickness of the bottom bracket area may also be consistent or may vary. For example, the metal disk may be machined to a thickness between around 0.5 to 2 mm and the carbon thickness can be between around 0.5 to 2.0 mm. The thickness of the bottom bracket area, in some embodiments is between 0.5 to 4 mm. In some embodiments, the thickness of the carbon forming the cylindrical body 44 and abutting the edges of the disks 32, 34 can vary, while the thickness of the disks is constant.

The schematic cross-sectional drawing of FIG. 7 illustrates the layers of carbon fiber over the metal disks 32, 34. During manufacture, as will be discussed in greater detail below, the carbon fiber may be layered over the metal disks 32, 34 such that the metal disks are fully embedded within the cylindrical body 44. The layers of carbon fiber may cause the bottom bracket area 30 to be thicker at the metal disks 32, 34, and/or to have a slightly undulating shape. Though shown with a generally flat outer diameter, the bottom bracket area 30 may also have an outer diameter that is variable.

The one or more disks can have an outer diameter that is slightly smaller than the outer diameter of the bottom bracket area. For example, the one or more disks can have an outer diameter of between about 39 to 71 mm or between about 46 mm to 60 mm. The carbon layer can then add between about 0.5 to 2.0 mm to determine the outer diameter of the bottom bracket area. It should be understood that the dimensions discussed herein can vary greatly and may depend on such features as the bearing size and placement, among other features.

It is a common practice for current designs of carbon fiber frame assemblies with carbon fiber bottom bracket assemblies to include plastic bearing cups.

These plastic bearing cups generally hold a cartridge bottom bracket in place within the bottom bracket area and are made to be easily replaceable. In this way, the plastic bearing cups allow looser tolerances between the bottom bracket and the bottom bracket area due to the conformable nature of the plastic bearing cups.

A metal disk within the bottom bracket area can provide many benefits over the use of a plastic bearing cup and over direct contact with carbon fiber. For example, the metal surface has increased wear resistance, and it generally will not need to be replaceable, thus it eliminates the need for any sacrificial parts. At the same time, some embodiments may still include both one or more metal disks and one or more sacrificial parts. FIG. 8 illustrates a cross section of a crankset and bottom bracket assembly for a bicycle. The bottom bracket area 30 contains two disks 32, 34 that are encapsulated within the carbon fiber cylindrical body of the bottom bracket area 30 as discussed above. Bearings 82, 84 may be inserted into the bottom bracket area 32, 34 such that the bearings 82, 84 are supported by the bearing surfaces 64, 164 of the disks 32, 34 (see FIG. 7). Additional fastenings, such as an adjustable cover 86 may be attached to the non-drive side (the side opposite the transmission 22) of the bottom bracket 11 to adjust and secure the bottom bracket and crankset assembly. Method of Manufacture Carbon fiber frame assemblies for bicycles can be made in many different ways. For example, cylindrical tubes can be joined with adhesives and lugs, in a method somewhat analogous to a lugged steel frame. This type of construction could include a one piece bottom bracket area 30 that may be formed integrally with a seat tube 31 and/or a down tube 27.

As another example, carbon fiber frame assemblies can be manufactured in a single piece, called monocoque construction, or similarly in discrete pieces or sections. This may require the use of internal bladders during the forming process that are later removed as is known in the art. The use of internal bladders generally requires access points into the tube, frame, or section of the frame. One access point that may be used is the bottom bracket area 30. In some embodiments, including the illustrated embodiment, metal disks 32 and 34 may be embedded within the carbon fiber layers of the bottom bracket area 30 and later machined to form an axial opening 35 configured to receive a bottom bracket.

Figure 4:
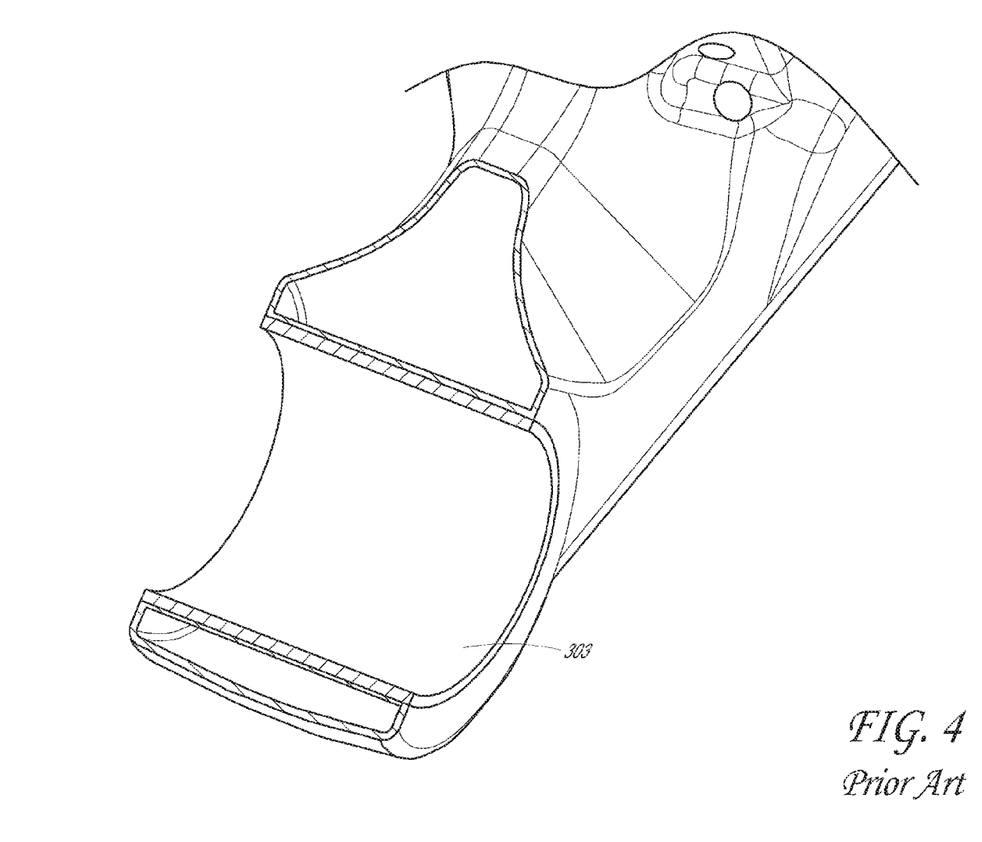
FIG. 4 shows a partial cross sectional view of a prior art bottom bracket shell.

Many previous bottom bracket assemblies incorporate a cylindrical tube 303 connecting the left and right sides of a carbon or aluminum frame (see FIG. 4). However, in the illustrated embodiments shown in FIGS. 5-7 and as described above, one or more metal disks 32, 34 may be embedded within the carbon fiber layers of the bottom bracket area 30 during molding. FIG. 5 illustrates carbon fiber layers and seat blanks being laid up within a mold 55 to form one embodiment of a bottom bracket area 30. In some embodiments, the alloy inserts, blanks, or disks 32, 34 may be forged to a smooth shape to assist with carbon molding. The disks 32, 34 may be made from carbon, aluminum, magnesium or a variety of materials. Internal mandrels can be used in connection with composite fabrication. Carbon plies can be wrapped, formed, or "laid up" around the internal mandrel (for example mandrel 40 shown in FIG. 5) and metal disks so that the metal disks are encapsulated by the carbon plies. The internal mandrel can be made of plastic, wood, or EPS Styrofoam. The purpose of the internal mandrel is to desirably form the carbon into the most accurate shape before placing the carbon ply-wrapped internal mandrel into an external mold. In some embodiments, the mandrel may not be removed. In some embodiments, the internal mandrel can melt or dissolve during the heated curing process. In other embodiments, the mandrel may be removed before the formed carbon plies are placed in the mold. In still further embodiments, the mandrel may stay inside the bottom bracket area permanently. In some embodiments, the internal mandrel incorporates some method of inflation or internal compression bladder, such as a nylon bag or latex balloon. The inflation preferably compresses the carbon against the external mold. In some embodiments, an internal mandrel may be used to form the composite seat support material structure without the accompanying use of an external mold. In some embodiments, a plastic bag may be placed fully around the carbon fibers formed around the internal mandrel. A vacuum is then drawn within the bag and the carbon plies are compressed against the internal mandrel to form the composite seat support material structure. These processes are generally referred to as "autoclave" processes. Any of these embodiments can create a composite seat support material structure, namely the bottom bracket area 30 with carbon fiber abutting each blank or disk 32, 34 on each side. During curing, some shifting of the disks 32, 34 within the cylindrical body 44 may occur. However, the bottom bracket area 30 can then be CNC machined through carbon fiber body 44 and at least partially through the metal disks 32, 34 to form the axial opening 35 that is configured and precisely aligned to receive a bottom bracket. Machining the bottom bracket area after molding preferably insures high accuracy and concentricity of the two sides. In some embodiments, the bottom bracket area 30 may be machined from one side (i.e., through disk 32) and then machined from the other side (i.e., through disk 34). In other embodiments, the bottom bracket area 30 may be machined from both sides simultaneously (i.e., through both 32 and 34).

The bottom bracket area 30 can then be bonded into a frame assembly or the above steps can be done in conjunction with co-molding the bottom bracket area 30 with the rest of the frame assembly. For example, carbon fiber can be laid up around the mandrel at the same time as carbon fiber is laid up to form the down tube and/or the seat tube. The frame assembly can be heat cured within a mold to be joined together as one piece or substantially one piece. Other methods can also be used to form all or part of the frame assembly.

Figure 9:
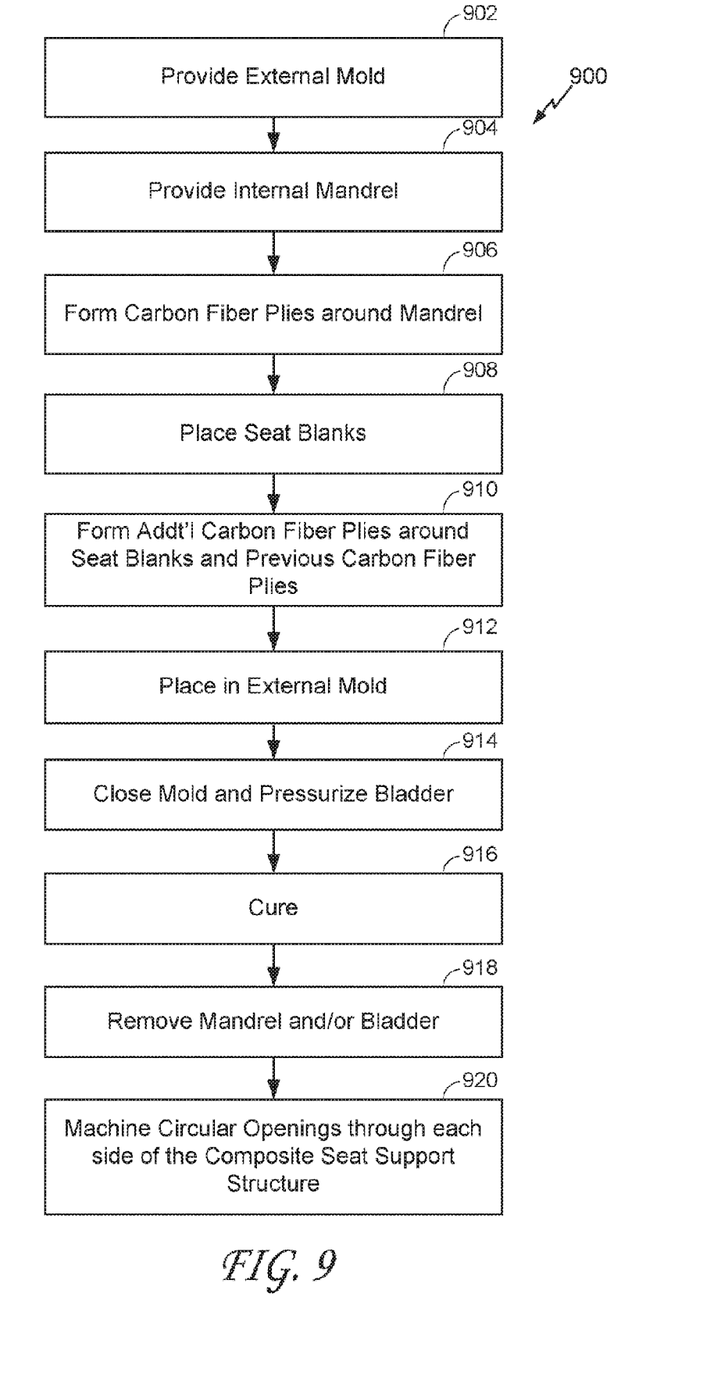
FIG. 9 is a flow chart illustrating some steps of a method of manufacturing a bottom bracket area.

FIG. 9 is a flow chart illustrating one method of manufacture for a bottom bracket area with embedded disks as shown in FIG. 6. First, in step 902, an external mold, such as a mold for molding carbon fiber frame pieces, is provided. Next, in step 904, an internal mandrel is provided. In some embodiments, as discussed above, an internal mandrel may not be used to mold the carbon fiber plies. In the next step, as illustrated by step 906, the carbon fiber plies are formed around the internal mandrel. Next, in step 908, seat blanks are placed within the first layer of carbon fiber. In the next step 910, additional carbon fiber is placed or laid up around the seat blanks and the previous layers of carbon fiber plies to form a composite seat support structure. In the next step 912, the carbon fiber plies, seat blanks, and internal mandrel are placed in the external mold. In some embodiments, no mandrel or internal compression bladder may be used to form the bottom bracket area. Next, in step 914, the mold is closed and the internal compression bladder is pressurized. After the mold is closed, the composite structure is cured, as illustrated by step 916. Once the composite structure has cured, the mandrel and/or the internal compression bladder are removed, as shown by step 918. However, in some embodiments, the internal mandrel may be left within the carbon fiber composite seat support structure, or the internal mandrel may dissolve during the curing step. Finally, in step 920, circular openings are machined through each side of the composite seat support structure to form the cylindrical opening configured to receive a bottom bracket. In some embodiments, openings of other shapes or other mounting patterns may be machined through each side of the composite seat support structure. Additionally, in other embodiments, multiple openings could be machined through each side of the composite seat support structure. In some embodiments, one side of the composite seat support structure may be machined followed by the other side. In other embodiments, both sides of the composite seat support structure may be machined simultaneously to insure precise alignment of the openings. Other embodiments may incorporate fewer or other additional steps than those listed in FIG. 9.

FIG. 9 illustrates one embodiment of a process for manufacturing a bottom bracket area. In other embodiments, this method of manufacture could apply to other composite frame elements of a bicycle, including but not limited to a "main pivot" suspension pivot, electric drive motor cranks, or internal gearbox assemblies.

The bottom bracket area 30 as illustrated in the attached figures can provide many benefits. The disks 32, 34 can be machined with high accuracy and concentricity such that the two sides of the axial opening 35 are aligned. Additionally, the disks 32, 34 can be machined such that the bearing surfaces 46, 48, may be customized to support the bearings of a bottom bracket as a bearing seat that can provide increased durability within a carbon fiber bottom bracket area. Additionally, the bottom bracket area provides the increased wear resistance of a metal bottom bracket shell with the weight advantage of a carbon fiber. No extra, sacrificial parts, such as plastic bearing cups, may be needed.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A method of forming a bicycle frame comprising:
providing at least one seat blank having a first side and a second side opposite the first side;
forming at least a portion of a frame around the at least one seat blank such that the frame prevents movement of the seat blank relative to the frame; and
machining the frame and the seat blank;
wherein the step of machining the frame occurs after the step of forming the portion of the frame.

2. The method of claim 1 further comprising providing one of a mandrel and an internal compression bladder.

3. The method of claim 1, wherein forming at least a portion of a frame around the seat blank further comprises forming a seat support structure that abuts the first and second sides of the seat blank.

4. The method of claim 1, wherein forming at least a portion of a frame around the seat blank further comprises forming a seat support structure such that the seat support structure surrounds the seat blank on all sides.

5. The Method of claim 2, wherein forming at least a portion of a frame around the at least one seat blank further comprises forming carbon fiber plies around the at least one seat blank and the internal bladder to form a seat support structure that surrounds the at least one seat blank on all sides.

6. The method of claim 5, further comprising curing the combined carbon fiber plies and the at least one seat blank.

7. The method of claim 6, wherein curing the combined carbon fiber plies and the at least one seat blank comprises applying heat to the combined carbon fiber plies and the at least one seat blank.

8. The method of claim 1, wherein machining the frame and the seat blank further comprises machining the seat support structure from the first side.

9. The method of claim 1, wherein machining the frame and the seat blank further comprises machining the seat support structure from both the first and second sides simultaneously.

10. The method of claim 1, wherein machining the frame and the seat blank further comprises machining the frame and the seat blank from the first side and then machining the frame and the seat blank from the second side.

* * * * *